United States Patent [19]

Waugh

[11] 4,092,953
[45] June 6, 1978

[54] APPARATUS FOR COATING GLASS CONTAINERS

[75] Inventor: Robert E. Waugh, Columbus, Ohio

[73] Assignee: The D. L. Auld Company, Columbus, Ohio

[21] Appl. No.: 748,946

[22] Filed: Dec. 9, 1976

[51] Int. Cl.² .................................. B05B 13/04
[52] U.S. Cl. ............................ 118/642; 118/302; 118/315; 118/321; 118/322; 427/385 A; 427/425
[58] Field of Search ............... 118/314, 315, 321, 322, 118/323, 642, 643, 302; 427/55, 425, 426, 287, 385 R, 387, 385 A

[56] References Cited

U.S. PATENT DOCUMENTS

| | | | |
|---|---|---|---|
| 2,756,647 | 7/1956 | Thompson | 118/315 X |
| 3,107,183 | 10/1963 | Way et al. | 118/313 X |
| 3,296,999 | 1/1967 | Gamble | 118/322 X |
| 3,431,889 | 3/1969 | Fraatz | 118/315 |
| 3,477,870 | 11/1969 | Boretti et al. | 118/302 X |
| 3,802,380 | 4/1974 | Ford et al. | 118/642 X |
| 3,875,893 | 4/1975 | Riley et al. | 118/315 X |
| 3,921,575 | 11/1975 | Ishii et al. | 118/322 |
| 4,009,301 | 2/1977 | Heckman et al. | 118/642 |

*Primary Examiner*—Mervin Stein
*Attorney, Agent, or Firm*—Biebel, French & Nauman

[57] ABSTRACT

An apparatus for coating a glass container with a layer of plastic whereby the container rotates about a horizontal axis and moves past a coating station. A plurality of liquid applicator nozzle means, positioned above the coating station, supply uncured plastic liquid to associated areas on the container. Means are provided for supplying predetermined quantities of uncured plastic liquid to respective ones of the nozzle means such that each nozzle means provides a coating of desired thickness and composition on its associated bottle area. The container is also rotated during the subsequent curing of the plastic.

6 Claims, 11 Drawing Figures

FIG-2
FIG-4
FIG-3
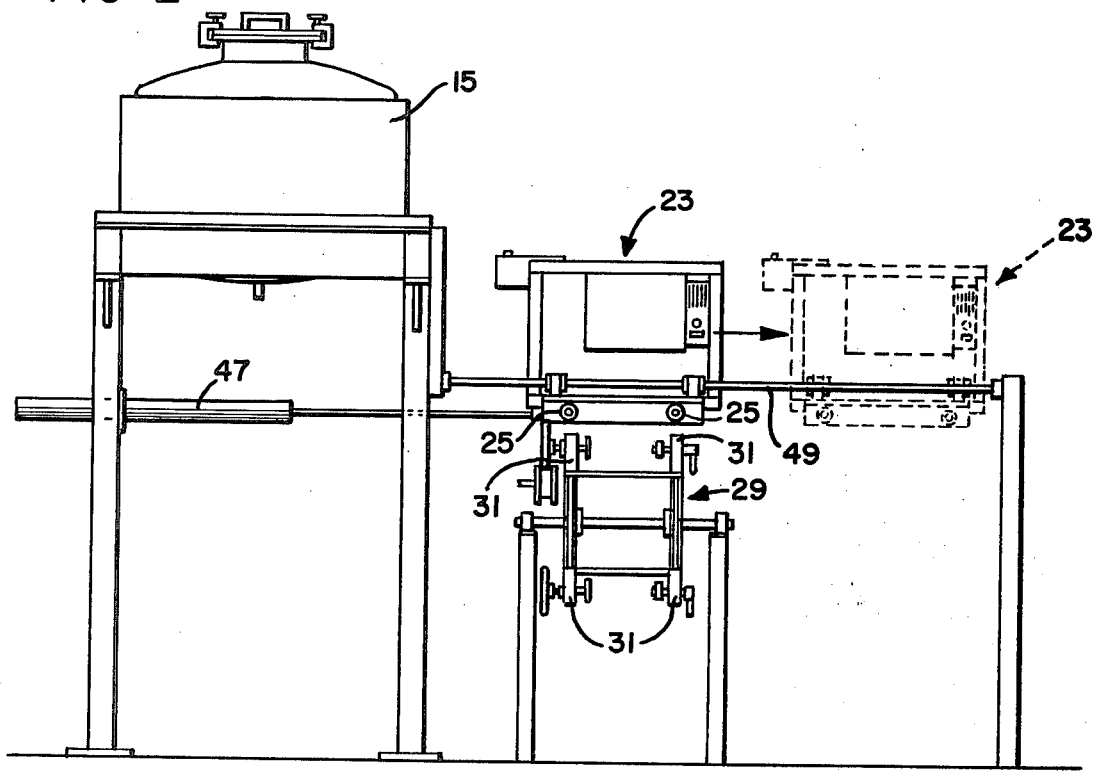
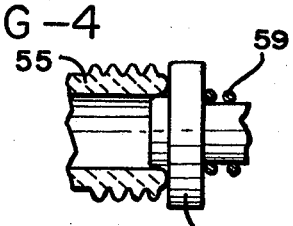
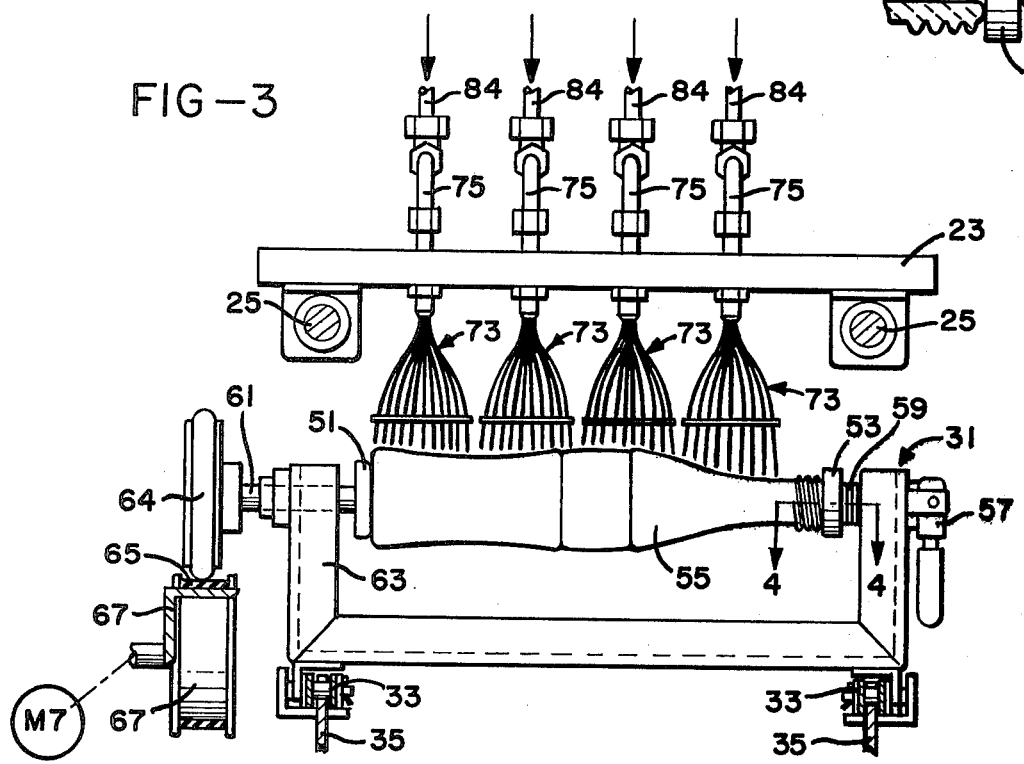

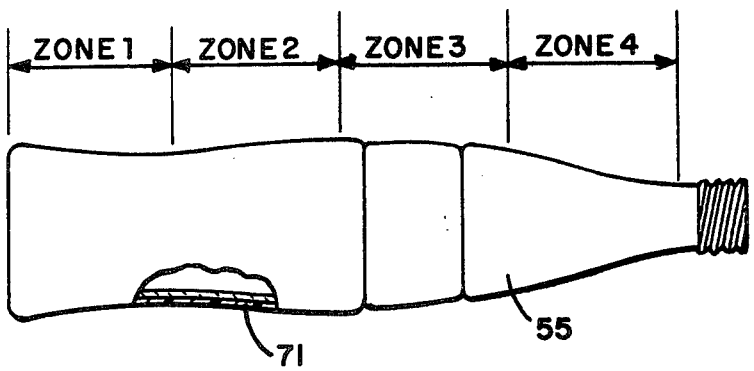
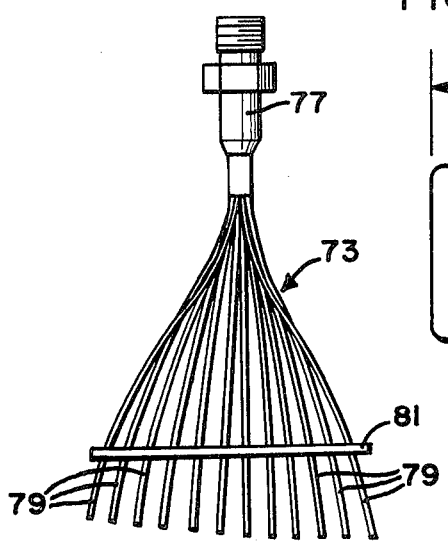
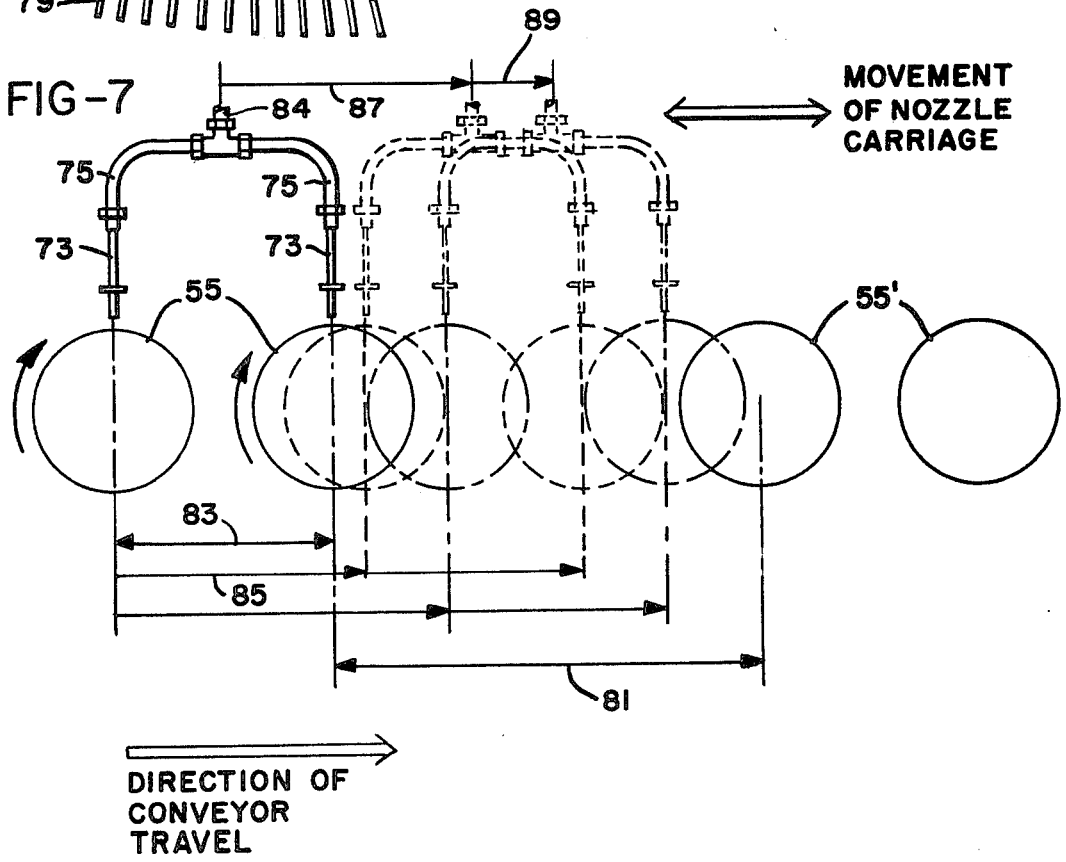

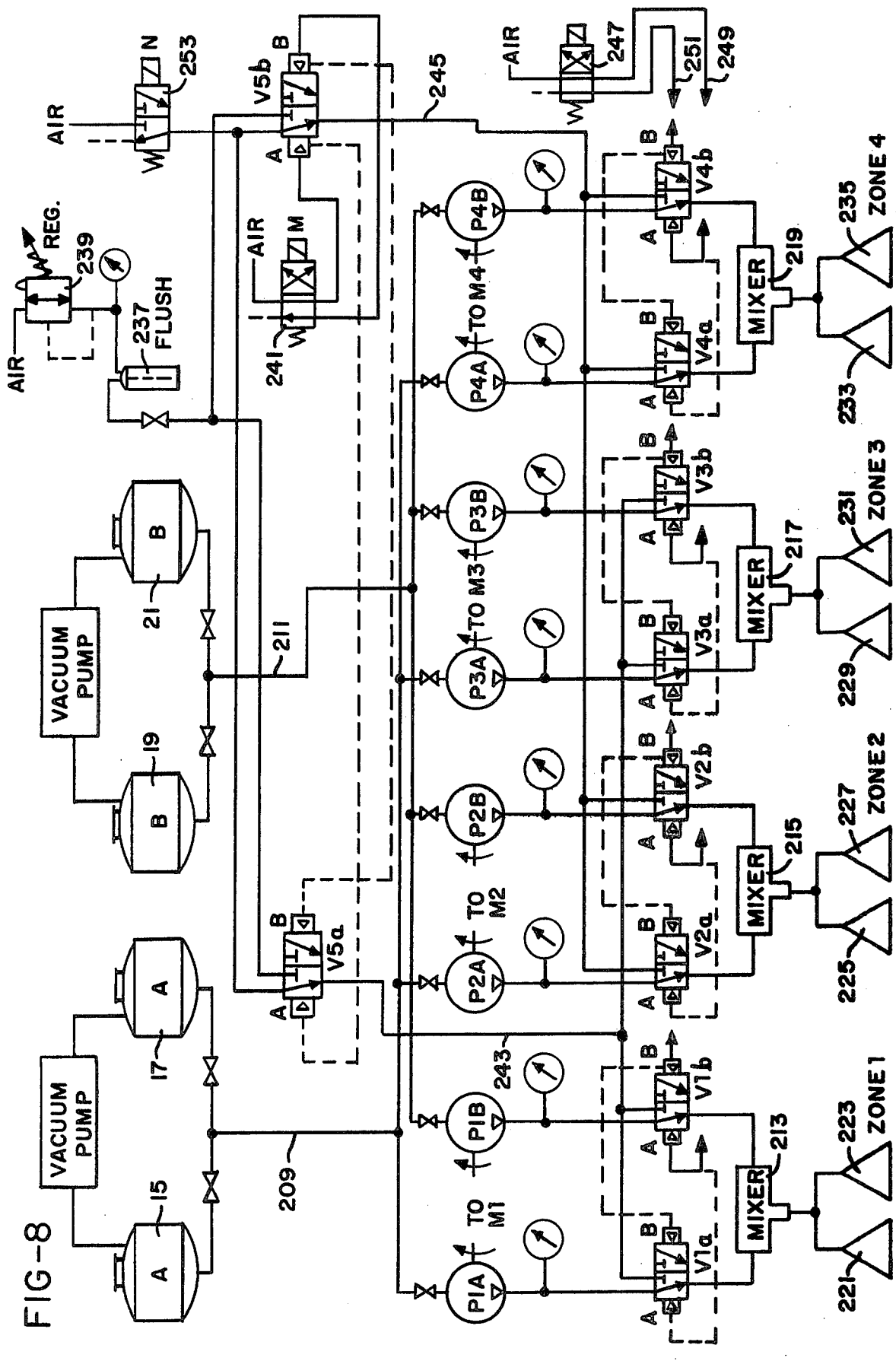

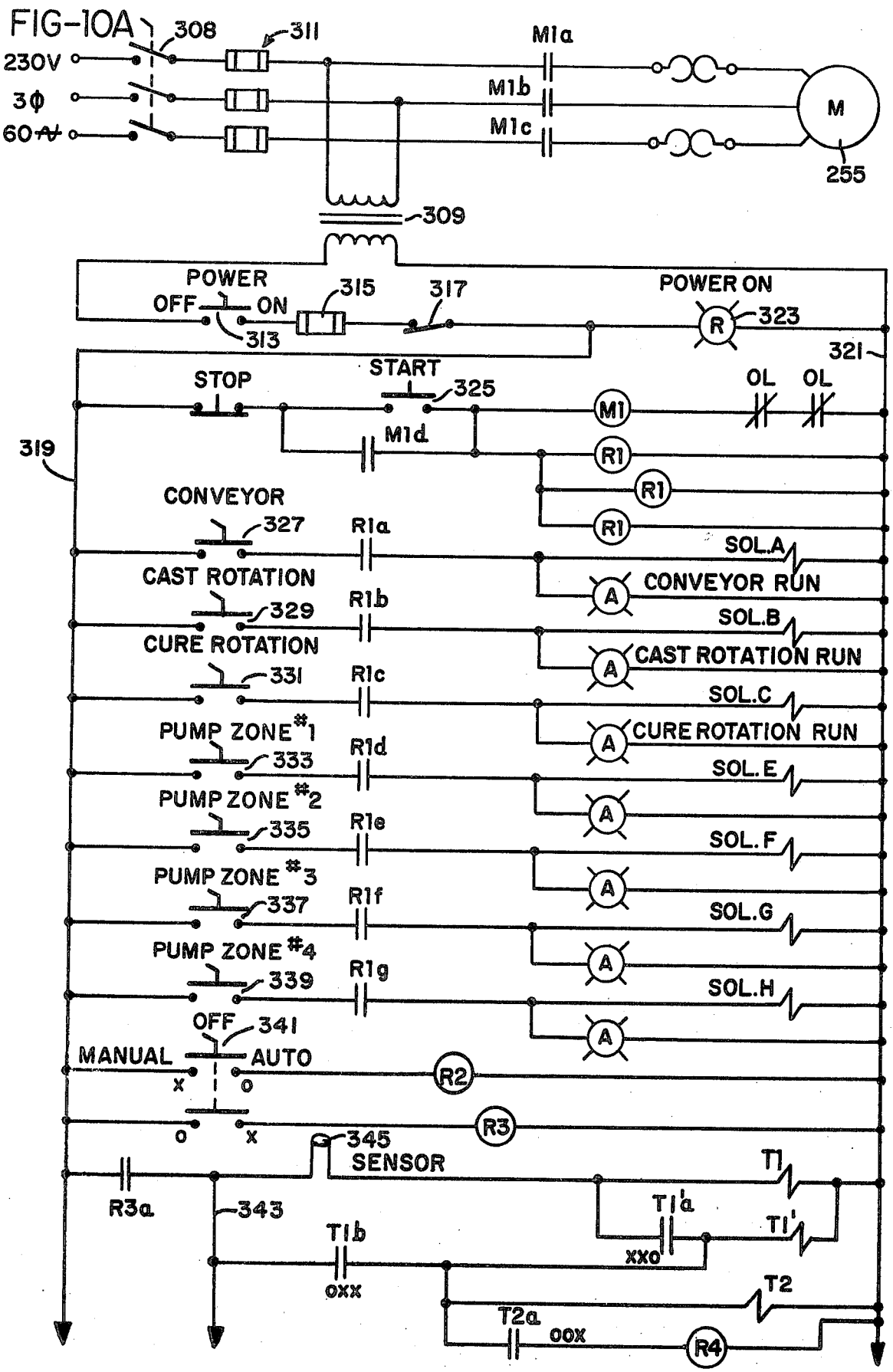

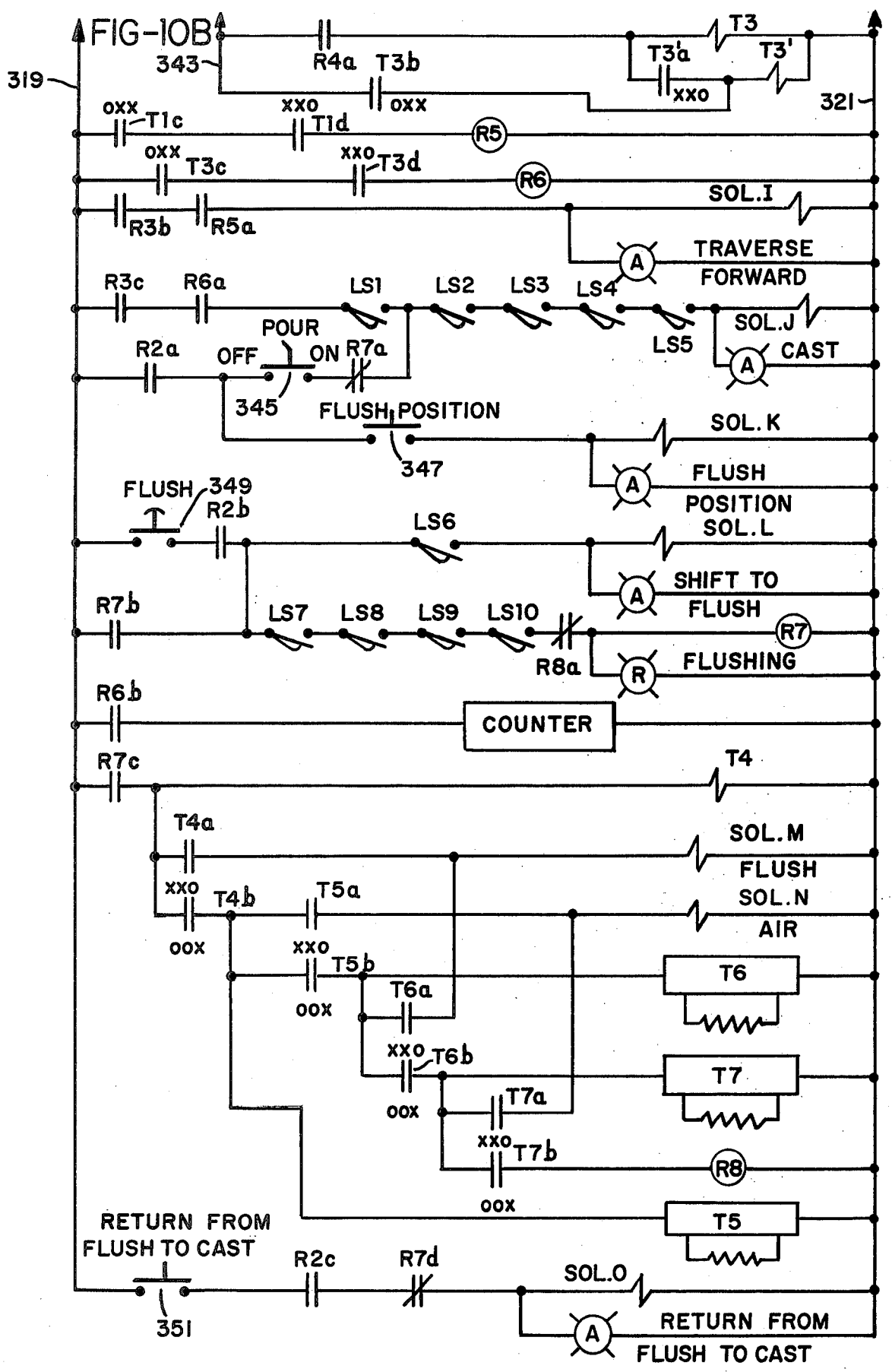

1

APPARATUS FOR COATING GLASS CONTAINERS

BACKGROUND OF THE INVENTION

The present invention relates to a device for coating glass containers and, more particularly, to a device for coating glass containers of varying shapes with a layer of plastic.

Glass containers, such as glass bottles, have long been used as receptacles for soft drinks and various other commodities since they are superior in many respects to other types of containers. The consumer can see the marketed commodity directly if the glass is transparent. Glass containers can be formed in a wide variety of shapes and sizes. Additionally, glass containers are easily sanitized. Finally, the recent growth in interest in energy conservation and in resource conservation has increased the attractiveness of glass containers since such containers are easily cleaned and sterilized and thus may be recycled easily. Glass containers are relatively sturdy and will hold up through a substantial number of recycling operations, although, after approximately twenty cycles abrasion marks on the glass will show.

One substantial drawback to the glass container is its tendency to shatter on impact with a hard surface, producing sharp glass shards. The safety risk involved with such breakage is heightened by the fact that many glass containers are pressurized (such as bottles containing carbonated beverages) and the shards which result from shattering the glass container will be scattered over a relatively large area.

It has been determined that coating glass bottles with various plastic materials, can significantly reduce the likelihood of breakage and reduce the scattering of glass shards in the event that breakage does occur. It has also been determined that a suitable coating properly applied to glass bottles will reduce the abrasion marks and reduce breakage during the filling and handling process thereby increasing the number of times a glass container can be recycled. Various techniques and materials have been developed, therefore, for coating glass containers such as glass bottles.

Most commonly used are polyvinyl chloride, polyurethane, polystyrene, ethylene-vinyl acetate copolymers and polyvinyl acetate resins; although, others including urethanes are disclosed in the patent literature. See, for example, U.S. Pat. Nos. 3,877,969; 3,889,031; 3,864,152; 3,178,049 and 3,823,032; all of which disclose utilizing polyurethane materials as a component of the coating. These patents also disclose various methods of applying the coatings to the glass bottle. In general it can be said that spraying and dipping are the basic methods used. U.S. Pat. Nos. 3,921,575 and 3,734,765 are examples of each type. A good enumeration of such methods is given in U.S. Pat. Nos. 3,825,141 and 3,825,142, where it is stated:

"It is, of course, appreciated that a suitable means of application of the coating material or sheath . . . to inner glass . . . is a necessity and as examples it is suggested that any of the following may be employed depending upon the manufacturer's desire:

a. By spraying the thermoplastic material as a powder, optionally by an electrostatic spraying method, onto the hot external surface of the inner receptacle;

b. By dipping the inner receptacle, maintained at an appropriate temperature, into a fluidized bed of the plastic material in powder form;

c. By dipping the inner receptacle, if desired while hot, into a molten bath of the plastic material or into a solution or a dispersion of such material, or d. By any other method of providing a sleeve type coating to an inner glass receptacle known in the art."

All of these methods suffer from several disadvantages in regard to the production of a coated shatterproof bottle that can be washed and processed repeatedly, that will resist wear and deterioration even at the points of stress, and where the coating will for extended periods retain its required ability to prevent shattering. One of the reasons for this is that the above-mentioned methods cannot be easily used to control the thickness of the coating layer. Additionally, if a liquid material is used it must be of a type which can be held in the dipping bath or spray container for extended periods of time without hardening.

One possible solution to the uniform coating and differential wear problem is to apply the coating differentially to the different parts of the bottle. This is difficult to do by conventional spraying or dipping techniques. A system which does utilize a differential coating is disclosed in U.S. Pat. No. 3,912,100 to Graham et al and U.S. Pat. No. 3,950,199 to Lucas. However, in the arrangement disclosed there, thermoplastic is applied to a band around the neck by spraying (U.S. Pat. No. 3,912,100) or with an applicator head (U.S. Pat. No. 3,950,199) and then a heat-shrink sleeve is applied to the rest of the bottle.

It would be desirable to have a system whereby adjacent zones are coated at the same time with differing amounts, thicknesses or compositions. While flow coating methods for applying different compositions are known (see U.S. Pat. No. 3,802,908 to Emmons), in that instance multiple nozzles are used to apply successive layers of thermoplastic coating material to the rotating cylinders. Applicant knows of no system whereby adjacent zones of a glass container are flow coated with a liquid plastic by use of a series of nozzle means.

Accordingly, it can be seen that a need exists for a method and apparatus for applying a controlled plastic coating across the surface of a glass container, whereby substantial numbers of glass containers may be efficiently coated with a plastic such as polyurethane. Additionally, the apparatus should be designed for easy cleaning at the conclusion of the coating process.

SUMMARY OF THE INVENTION

The present invention meets this need by providing a method and apparatus for coating a glass container (bottles, jars, tubes, etc.) with a layer of plastic by rotating the container about a horizontal axis while moving the container past a coating station having a plurality of liquid applicator nozzles. Each nozzle means, or series of applicator tubes, applies an uncured liquid plastic such as polyurethane to an associated area of the container as the container is moved past the coating station in a direction perpendicular to the container axis. Means are provided for supplying predetermined quantities of uncured liquid plastic (which may vary in composition, amount, color, etc.) to respective ones of the nozzle means. Means are also provided for rotating the coated container slowly as the coated container moves through a curing zone and for cleaning the nozzle means by pumping solvent therethrough.

With this arrangement of apparatus means, it is possible to efficiently coat a large number of containers rapidly and effectively. In general, the preferred method performed with this apparatus is for coating glass bottles and is as follows:

(a) the bottles are cleaned in a standard bottle washing process, (b) a silane primer is applied from a solvent mixture and the bottles are dried to remove the solvent; this may be performed as a part of the continuous flow coating process or prior to introducing the bottles into that process, (c) if priming is done as a pre-treatment, the primed bottles are loaded onto the continuous conveyor, (d) if desired, the bottles may be passed through a preheat (110° – 130° F) to remove any remaining solvent from the primer and assist in flow of the uncured polyurethane liquid plastic, (e) the uncured polyurethane liquid plastic is mixed and metered in predetermined amounts to each nozzle means (for example, four series of applicator tubes varying from 10–26 tubes each) and cast from the separate nozzle means as the bottle is rotated at approximately 40–60 RPM beneath the nozzle means; the bottle may make one or two revolutions per cast cycle, each casting cycle lasting 1 – 1.5 seconds, (f) after casting, the coated bottle is moved into a curing zone, such as an infrared oven, for a period of time sufficient to cure the polyurethane resin; the bottle is rotated at approximately 20–30 RPM during curing to assure uniformity of the coating, (g) the bottles are then cooled by air blast or at ambient temperature before being removed from the continuous conveyor.

In this manner it is possible to coat glass bottles or other glass containers with a plastic such as polyurethane without the use of solvent sprays, dip baths or electrostatic means, and yet, with superior flexibility and control over the amount and type of deposition. This enables one to coat the bottles uniformly, protecting even the protruding portions, or even to apply thicker and/or tougher coatings at such wear areas. Likewise, the process can be used to recoat worn areas of the bottle coating without recoating the whole bottle. The bottle coated with a polyurethane material in accordance with the present invention has been found to perform in a superior manner both in terms of the durability of the coating, resistance to abrasion and its ability to resist shattering.

Accordingly, it is an object of the present invention to provide a method and apparatus for container coating in which separate coating fluid applicator means are provided for each of a number of container areas; to provide such a method and apparatus in which the surface areas are coated simultaneously; and to provide such a method and apparatus in which clean up after coating may be easily accomplished.

Other objects and advantages of the present invention will be apparent from the following description, the accompanying drawings and the appended claims.

BRIEF DESCRIPTION OF THE DRAWINGS

FIG. 2 is a side view of the embodiment of FIG. 1, as seen looking left to right in FIG. 1;

FIG. 3 is a view illustrating the coating nozzle arrangement of the present invention;

FIG. 4 is an enlarged partial sectional view, taken generally along the line 4—4 in FIG. 3;

FIG. 5 is an enlarged view showing a coated bottle with a portion broken away and in section;

FIG. 6 is an enlarged view showing a single nozzle;

FIG. 7 is a diagrammatic view illustrating the motion of the nozzle carriage during the coating process;

FIG. 8 is a view showing the systemic system for supplying uncured liquid plastic to the nozzles;

FIGS. 10A and 10B, when placed together with FIG. 10A above FIG. 10B, illustrate the electrical control circuit of the present invention.

DETAILED DESCRIPTION OF THE PREFERRED EMBODIMENTS

Figure 1:
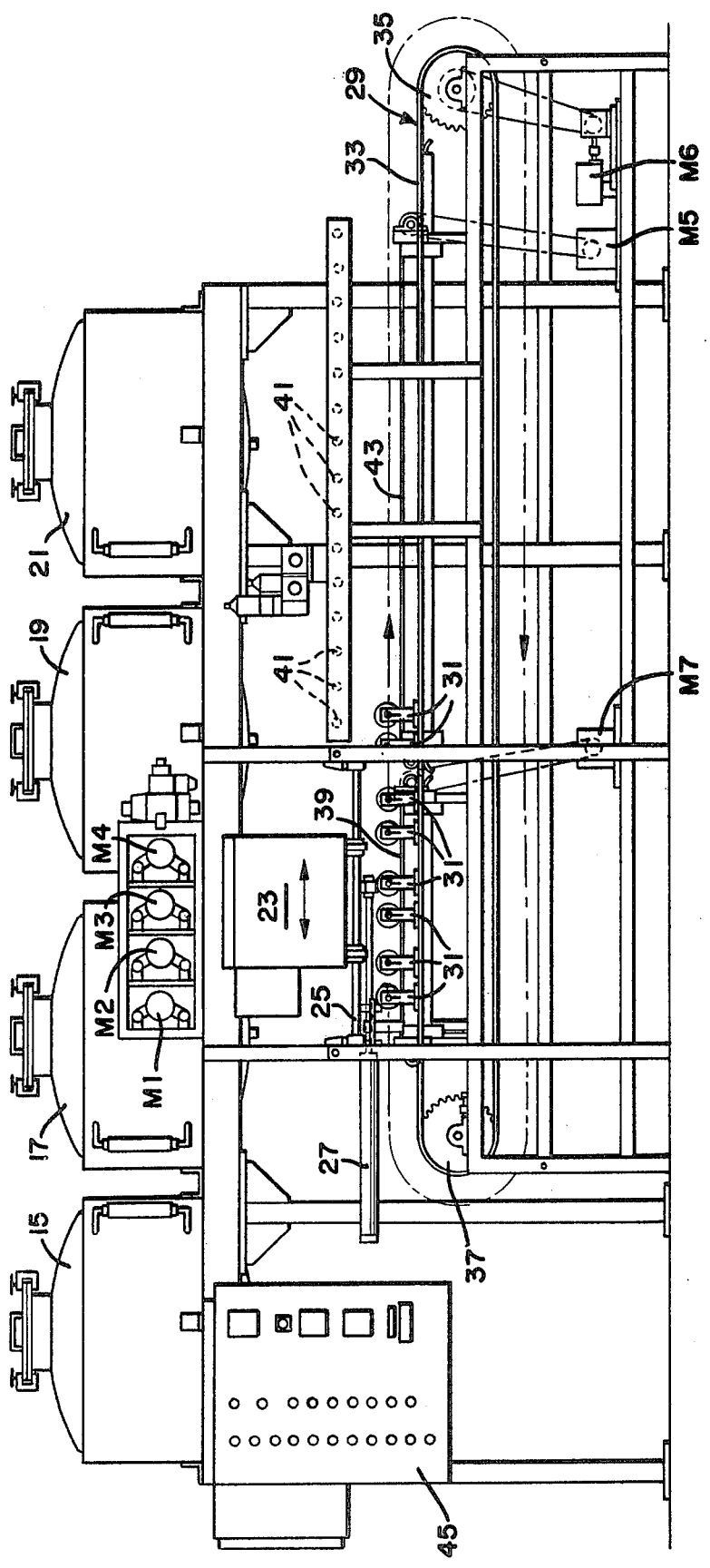
FIG. 1 is an overall view of an embodiment of the present invention.

Reference is now made to FIG. 1 in which the preferred bottle coating device of the present invention is illustrated.

The bottles are intended to be coated with an uncured polyurethane liquid plastic, which is quickly cured under either ultraviolet or infrared light. Preferred is a mixture of "A" and "B" components of the type disclosed in copending application Ser. No. 702,194, filed July 2, 1976. Basically that mixture is one of a polyether polyol component ("A"), which may be a difunctional, trifunctional and/or tetrafunctional polypropylene glycol containing a suitable catalyst, and a diisocyanate component ("B") such as an aliphatic diisocyanate. As stated in application Ser. No. 702,194, which is specifically incorporated herein by reference, an example of the diisocyanate is Hylene W from E. I. duPont de Nemours & Co., and the polyether polyol may be one or more of the Pluracol materials (P-410 or TP-440) from BASF Wyandotte. It may also be a polyether-polyester polyol combination. The ratio of components A:B is preferably 50–60:40–50. A polyester polyol or polylactone polyol could be used in place of the polyether polyol.

The mixture of "A" and "B" components of this type cures, through catalytic action, under heat such as produced by infrared radiation. Accordingly, this type of arrangement will be disclosed as the preferred embodiment; although, single component, photocurable, polyurethanes of known types could also be used.

In either event it is desirable to prime the glass bottle with a silane before coating. As an example, a mixture of approximately 2% castor oil (Surfactol from The Baker Castor Oil Co.) and up to approximately 2% silane (Dow 6020, 6040 or 6075 from Dow Corning Corp., which are respectively, 3-(2-aminoethylamine) propyltrimethoxysilane, glycidoxypropyltrimethoxysilane, and vinyltriacetooxysilane) in a solvent (70% isopropyl alcohol and 30% acetone) may be used. Othe known silane primers may also be used. The primers may be pre-applied by spraying or dipping, followed by drying to remove the solvent. Alternatively, it may be applied as an initial step in a continuous bottle coating process of the type described hereinafter.

In the preferred form of that process, tanks 15 and 17 are provided to store the "A" material while tanks 19 and 21 provide storage for the "B" material. Only one of tanks 15 and 17 and one of tanks 19 and 21 will be used as a supply at any one time, thus permitting the other of each pair to be refilled. A plurality of hydraulic motors M1, M2, M3, and M4 are provided for driving a plurality of associated pairs of pumps which pump the "A" and "B" materials to a plurality of nozzle means on nozzle carriage 23. Nozzle carriage 23 is slidably mounted on rods 25 for motion as indicated, under control of hydraulic cylinder 27.

Conveyor mechanism 29 is driven by hydraulic motor M6 and has mounted thereon a plurality of pairs of bottle chucks 31. For the sake of clarity only a few chucks are shown in FIG. 1; however, it should be understood that the chucks in the device are mounted in pairs all along the conveyor mechanism 29. The conveyor may advantageously comprise a pair of chains 33 driven by sprockets 35 and passing around idler sprockets 37. A hydraulic motor M7 drives rotation mechanism 39 which rotates the bottles as they pass beneath the nozzle carriage 23 through an area termed the coating station. As mentioned, the bottles may be primed by being pre-coated with silane prior to coating. The primed bottles are placed in the chucks at the left end of the conveyor. The bottles are rotated and coated at the coating station and then pass beneath a plurality of infrared lamps 41 which accelerate the curing of the liquid plastic. A cure rotation arrangement 43 is driven by motor M5 and is provided to rotate the bottles continuously as they pass beneath the lamps 41. The coated bottles are then removed from the chucks at the right end of the conveyor. Cabinet 45 houses the electrical control circuitry of the present invention.

As seen in FIG. 2, the nozzle carriage 23 may be shifted laterally by hydraulic cylinder 47 such that the nozzle carriage will no longer be positioned above the conveyor 29. The carriage 23 is slidably shifted on rods 49 to the position shown by the dashed lines in FIG. 2 when it is desired to clean the system by flushing it out with solvent. A container may be placed beneath the nozzle carriage to catch the solvent discharged during the flushing operation.

In FIGS. 3 and 4, the bottle chuck mechanism for holding and rotating a bottle during the coating and curing process is illustrated in greater detail. Each bottle to be coated is placed on a chuck 31 which includes bottle gripping pads 51 and 53. As seen in FIG. 4, pad 53 is shaped to extend slightly into the mouth of the bottle 55 and thereby to engage the bottle securely. Pad 51 is shaped to conform to the bottom contour of the bottle 55. Lever mechanism 57 may be shifted to pull pad 53 outwardly from the bottle against the force of compression spring 59, thus permitting the removal of the bottle at the completion of the coating process and the insertion of an uncoated bottle.

Pad 51 is connected to shaft 61 which is journaled in member 63 and is free to rotate. Rotation wheel 64 is driven by belt 65 which forms a portion of the rotation mechanism 39 (FIG. 1). Belt 65 extends the length of the coating station and is driven by hydraulic motor M7 via driving pulley 67 at a speed which exceeds the speed of conveyor 29. Belt 65 therefore engages wheel 64 and, backed by metal strip 69, causes bottle 55 to rotate at approximately 40 to 60 R.P.M. during the coating process. A rotation belt is likewise included in the rotation mechanism 43 for rotating the bottle during curing of the plastic, preferably at a speed of approximately 20-30 R.P.M. Rotation at the coating station and during curing results in a uniform distribution of liquid plastic and prevents streaks or other imperfections in the coating layer.

A pre-heating station (not shown) may be placed before the coating station for the purpose of pre-heating the bottles to around 110°-130° F in order to aid the flow of the coating onto the bottle. This is not required, however.

As seen in FIG. 5, a typical soft drink bottle which is to be coated with a layer 71 of plastic may vary somewhat in circumference along its length and may have ridges or other points of sharp surface curvature. It will be appreciated that the volume of liquid plastic which would be desirable to apply may vary along the length of the bottle. The bottle of FIG. 5 has been divided into four zones and it is clear that if a coating of uniform thickness were desired, a greater volume of plastic would be required for zone two, for example, than for zone four. Additionally, it may be desired to apply a thicker and/or tougher coating of plastic to the surface areas of the bottles which receive the greatest stress and wear. Typically, these areas are the areas with the largest circumference and the rim around the bottom of the bottle.

In order to provide the desired thicknesses of plastic in each zone, a plurality of liquid applicator nozzle means 73, as seen in FIG. 3, are provided. The nozzle means for each zone has its own supply of uncured liquid plastic 75 and applies different predetermined quantities of uncured liquid plastic to its associated zone during the coating process. Accordingly, the different zones of the bottle may be coated with plastic of differing thickness, composition, color, etc.

FIG. 6 illustrates one of the nozzle means 73 in greater detail. A fitting 77 connects each of a plurality of fluid carrying tubes 79 to its associated liquid plastic supply. The number of tubes 79 and the spacing between the tubes in an individual nozzle means will vary in dependence on the bottle contour. It has been found, however, that between 10 and 26 tubes, spaced apart approximately ⅛ to 1/10 inch, may be used for each nozzle means in the present embodiment. The tubes preferably have 0.022 inch I.D. and a 0.039 inch O.D. Spacer bar 81 holds the tubes 79 spaced apart at desired distances. For application of a uniform thickness coating across each of the four zones of a ½ or 1 liter bottle of the type shown in FIG 3, 18 tubes are used in each of the first three nozzle means and 12 are used in the fourth. Such a nozzle means arrangement is preferably used with a flow rate of around 145 g/min. to deposit 3-15 grams of liquid plastic per bottle to a thickness of 100-250 microns.

FIG. 7 is a diagrammatic representation of the coating process looking at the device from the same side as in FIG. 1. The initial position of a pair of bottles 55 at the coating station is shown by the solid circles. A pair of bottles 55' which have just been coated are spaced along the conveyor by a distance 81. The pair of bottles are spaced apart from each other by a distance 83. The pair of bottles 55 will be coated simultaneously by two sets of nozzle means 73. One of a plurality of supply tubes 84 provides the uncured liquid plastic to nozzle means which coat corresponding zones on the two bottles. The bottles 55 are coated as they rotate and, at the same time, move through the coating station on the conveyor by a distance 85. The nozzle means 73 are also moved along the conveyor a corresponding distance 87 such that they remain above the respective bottles 55 during coating. Coating of the bottles then ceases but the nozzle means continue to move with the rotating bottles a distance 89 such that the nozzle means themselves will be completely drained of coating fluid. The nozzle means 73 are then returned to their initial position to await the movement of the succeeding pair of bottles into position at the coating station. Alternatively the continuous movement of the bottles may be temporarily halted during the coating operation, in which case movement of the nozzle means is not necessary.

Referring now to FIGS. 8, 9, 10A and 10B, the systemic hydraulic and electrical systems for the device of the present invention are shown. As seen in FIG. 8, the "A" material is stored in tanks 15 and 17, and the "B" material is stored in tanks 19 and 21. All four tanks are partially evacuated. As mentioned previously dual tanks are used for storage of each material so that one tank may be refilled while the material is supplied to the coating device by the other tank.

"A" material is supplied through line 209 to pumps P1A, P2A, P3A, and P4A. Similarly, "B" material is supplied through line 211 to pumps P1B, P2B, P3B, and P4B. Hydraulic motor M1 is mechanically coupled to pumps P1A and P1B; hydraulic motor M2 is mechanically coupled to pumps P2A and P2B; hydraulic motor M3 is mechanically coupled to pumps P3A and P3B; and, hydraulic motor M4 is mechanically coupled to pumps P4A and P4B. The mechanical coupling between each of motors M1–M4 and their associated pumps is such that each set of pumps will pump the required proportion of "A" and "B" material as the motor rotates.

Valves V1a, V1b, V2a, V2b, V3a, V3b, V4a, and V4b are coupled to the pump outputs and, when in the positions shown in FIG. 8, supply the "A" and "B" material to mixers 213, 215, 217 and 219. These mixers may simply be tubes which contain a plurality of static vanes or baffles which will cause the fluid pumped therethrough to be mixed thoroughly. Nozzle means 221, 223, 225, 227, 229, 231, 233, and 235 simultaneously supply the uncured liquid plastic to the four zones on two bottles. During the normal coating operation, all of the systemic valves will remain as shown in FIG. 8. Control of the application of uncured liquid plastic will be accomplished by controlling the operation of hydraulic motors M1–M4.

At the end of a period of operation, it may be desired to shut down the machine. As discussed above, it is then necessary to clean, the portions of the systemic system having the mixed "A" and "B" material before this material cures. For this purpose, a tank 237 is provided containing a solvent to dissolve the mixed "A" and "B" material before it self-cures. Pressurized air is provided through valve 239 such that the flush tank is held pressurized. When valves V5a and V5b are actuated into their B positions by solenoid actuated valve 241, the solvent fluid will flow through lines 243 and 245.

Solenoid actuated valve 247 supplies air through line 249 to the pilot on the A side of valves V1a, V1b, V2a, V2b, V3a, V3b, V4a, and V4b. Likewise, the pilot for the B side of these valves is connected to line 251. It is clear, therefore, that when valve 247 is actuated such that the air is supplied to the B sides of valves V1–V4 on line 251, the solvent in lines 243 and 245 will flow through valves V1–V4, mixers 213–219, and nozzle means 221–235. After a sufficient quantity of solvent has flowed through the lines, valves V5a and V5b are returned to their A positions. Valve 253 is then actuated and pressurized air is supplied to lines 243 and 245 to flush these lines and their associated valves and nozzles of all solvent and uncured plastic. The application of solvent and air to these lines may be repeated to insure adequate cleaning.

Figure 9:
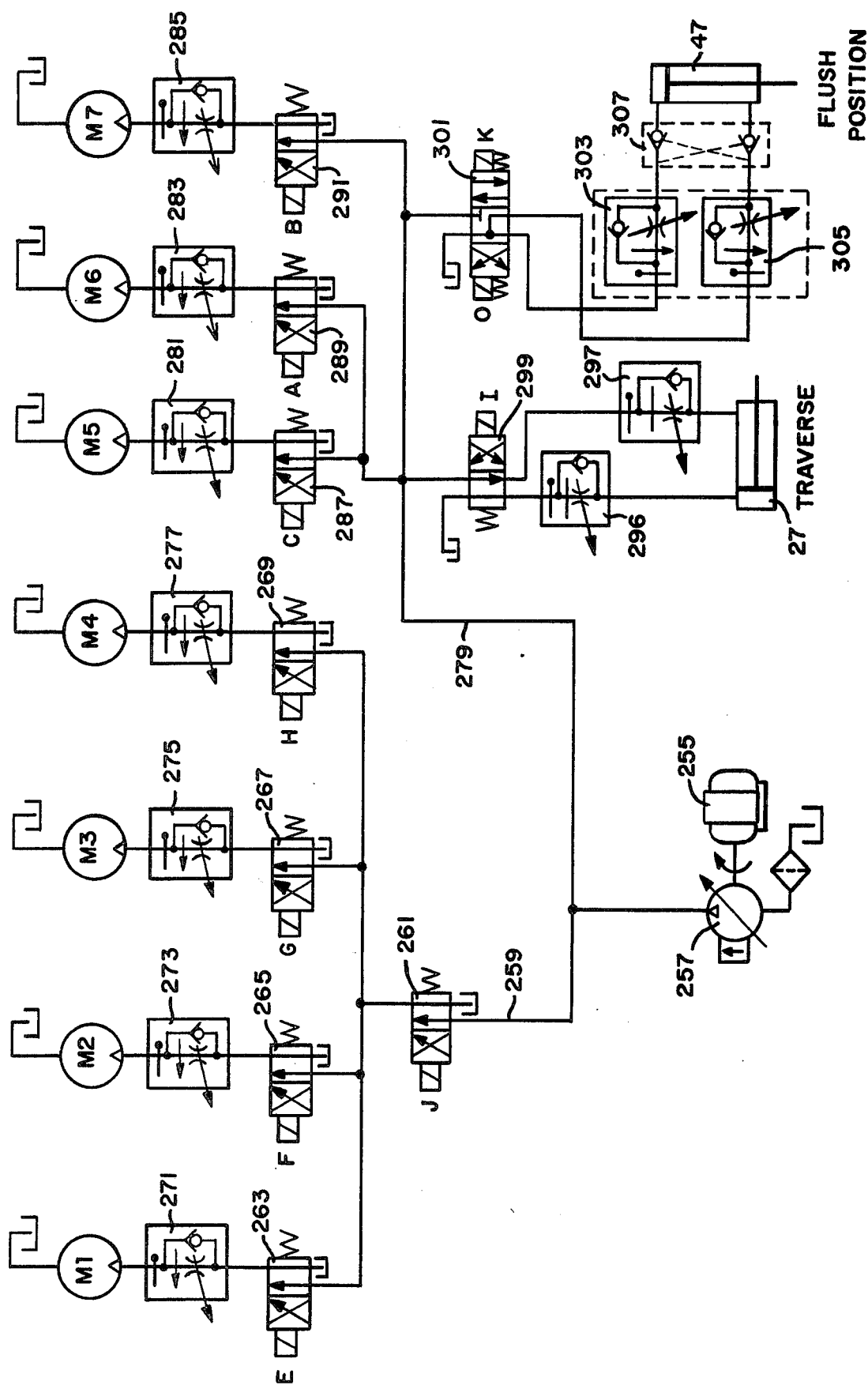
FIG. 9 is a schematic diagram illustrating the hydraulic system of the present invention.

Reference is now made to FIG. 9, in which the hydraulic portion of the present invention is illustrated schematically. Electric motor 255 drives hydraulic pump 257 and provides the sole source of power for the hydraulic system. Motor 255 may typically be a 10 horsepower, 1800 R.P.M., 3 phase, AC motor. Hydraulic fluid is supplied on line 259 to valve 261. Valve 261 is, in turn, connected to valves 263, 265, 267, and 269. When pump 257 is being driven and valves 261–269 are actuated, adjustable pressure and temperature compensated valves 271, 273, 275, and 277 provide hydraulic fluid to hydraulic motors M1, M2, M3, and M4, respectively. As discussed above in regard to FIG. 8, motors M1 through M4 provide the driving power to the systemic pumps which pump the uncured liquid plastic to the nozzles. Motors M1–M4 are, therefore, periodically driven during the coating operation under the control of valves 261–269.

Hydraulic fluid is also supplied to line 279 by pump 257 and motors M5, M6, and M7 are provided with hydraulic fluid through valves 281, 283, and 285 via valves 287, 289, and 291. Motor M5 is connected to drive the cure rotation belt mechanism 43. Motor M6 drives the conveyor 29, and motor M7 drives the cast rotation mechanism 39. Additionally, hydraulic cylinders 27 and 47 are operated to move the nozzle carriage. Cylinder 27 is the traverse cylinder mechanism for moving the carriage along the conveyor during the coating operation. Cylinder 27 is supplied with fluid through valves 296 or 297 via valve 299. Similarly, cylinder 47 moves the carriage laterally such that flushing may be carried out to one side of the conveyor. Valve 301 applies fluid to either valve 303 or valve 305. Pressure piloted check valves 307 insure that the cylinder 47 maintains the desired position when set.

FIGS. 10A and 10B illustrate the electrical control circuitry for the present invention in detail when placed together with FIG. 10A positioned above FIG. 10B. In FIG. 10 the relay coils are designated with "R" and a number; the corresponding relay coil contacts have the same designation with an additional letter. Similarly, timer coils are given a numbered "T" designation with the timer contacts designated with a corresponding number and an additional letter. Each timer contact has associated therewith a three symbol code consisting of "X's" and "O's." An "X" indicates a closed contact and an "O" indicates an open contact. The first of the three symbols indicates the contact state prior to the timing operation; the second of the three symbols indicates the contact state during timing; and, the third of the three symbols indicates the contact state after timing but prior to reset.

Switch 308 is closed to apply power to transformer 309 via fuses 311. When the POWER switch 313 is momentarily closed, power is supplied through fuse 315 and switch 317 to lines 319 and 321. Light 323 indicates that the power has been turned on. Switch 317 is a safety switch which is closed only when the control panel cabinet is closed.

When START switch 325 is momentarily closed, relay M1 locks itself in through normally open contacts M1d and closes normally open contacts M1a–M1c, resulting in power being applied to motor 255. Motor 255 is mechanically linked to pump 257 (FIG. 9) and powers the hydraulic system. Relay coils R1 are also energized, causing normally open contacts R1a-R1g to be closed.

When switch 327 is closed, solenoid A will be energized, thus actuating valve 289 (FIG. 9) and causing the conveyor to be powered by motor M6. When switch 329 is closed, solenoid B will be energized, thus actuating valve 291 (FIG. 9) and causing motor M7 to power the coating rotation mechanism. Similarly, when switch 331 is closed, solenoid C is energized, thus actuating valve 287 and causing motor M5 to power the cure rotation mechanism. Switches 333, 335, 337 and 339 control application of power to solenoids E, F, G, and H, respectively and, in turn, control valves 263-269 (FIG. 9). Since these valves provide the hydraulic fluid to motors M1-M4, switches 333-339 must be closed for application of liquid plastic to the four zones of a bottle.

Mode switch 341 may be set into a manual mode operation, in which case relay coil R2 is energized, or into an automatic mode, in which case relay coil R3 is energized. Assuming that switch 341 is set into the automatic mode, normally opened contact R3a will be closed, thus supplying power to line 343. Sensor 345 senses the presence of a bottle chuck at a desired position on the conveyor. Typically the sensor will energize coils T1 and T1', through contact T1a', as a bottle approaches the coating station. Contact T1b will immediately close, thus energizing the coil of timer T2. Timer T1 controls the movement of the nozzle carriage along the conveyor at the coating station. Timer T2 insures a short delay of approximately 0.2 seconds after the initiation of carriage movement before the coating process is begun. When timer T2 times out, contacts T2a will close, thus energizing relay coil R4. Relay contacts R4a then close energizing timer T3 which controls the duration of the coating operation.

Timer contacts T1c and T1d are connected in series with coil R5 such that R5 will be energized only during the forward traverse operation. Similarly, timer contacts T3c and T3d are connected in series with relay coil R6 such that this relay coil will be energized only during the coating operation. Timer T3 will typically be of a duration such that, even though it is started subsequent to timer T1 by a time equal to the timing cycle of timer T2, timer T3 will complete its timing cycle prior to the completion of that of timer T1.

Since relay R3 will be energized when the mode switch 341 is in the automatic mode, relay contacts R3b will be closed in this mode. When relay coil R5 is energized, the contacts R5a will close, thus energizing solenoid I. As seen in FIG. 9, this will actuate valve 299 and cause hydraulic cylinder 27 to extend. The rate of such extension is precisely controlled by valve 297 such that the nozzle carriage will move in synchronism with the conveyor.

Contacts R3c will be closed when the device is in the automatic mode and contacts R6a will be closed during the timing cycle of coating timer T3, energizing solenoid J via limit switches LS1, LS2, LS3, LS4, and LS5. Limit switch LS1 is positioned such that it will be closed when the nozzle carriage is positioned over the conveyor (rather than in the flush position). Limit switches LS2-LS5 are associated with valves V1-V4 (FIG. 8) and are closed when those valves are in their A positions. Solenoid J will therefore actuate valve 261 (FIG. 9), causing motors M1-M4 to be operated and resulting in pumps P1-P4 (FIG. 8) pumping the uncured plastic liquid to their respective nozzle means 231-235.

When timer T3 times out, coil R6 will be deenergized and thus deenergize solenoid J, terminating the coating operation. Subsequently, timer T1 will time out, deenergizing coil R5 and solenoid I. Valve 299 (FIG. 9) will be deactivated and the cylinder 27 will retract, moving the nozzle carriage back to its starting position to await initiation of a subsequent coating operation. Contacts R6b will be closed during each coating operation, incrementing counter 344 and providing a running total of the number of coating operations performed.

When it is desired to control manually the application of the plastic liquid by the nozzle means, the mode switch 341 is switched into the MANUAL position, energizing relay R2. Contacts R2a are then closed and solenoid J may be energized by closing the POUR switch 345. The nozzle carriage will remain stationary and plastic liquid will be supplied to the nozzle means as long as switch 345 is closed. The manual mode will typically be used only in setting up the machine, checking its operation, and during the flush operation.

The balance of the electric circuitry controls the flush operation in which solvent and compressed air are forced through portions of the systemic system. When it is desired to flush the system, the mode switch 341 is set into the MANUAL position, energizing relay coil R2 and closing contacts R2a. Flush position switch 347 is then closed, energizing solenoid K, and thus actuating valve 301 (FIG. 9) to cause hydraulic cylinder 47 to extend. This results in the nozzle carriage 23 being shifted laterally into the flush position at the side of the conveyor. Flush switch 349 is then closed, energizing solenoid L through contacts R2b and limit switch LS6. Limit switch LS6 is closed when the nozzle carriage 23 has been shifted laterally into the flush position. Energization of solenoid L results in valve 247 (FIG. 8) being actuated and causes valves V1a-V4a and V1b-V4b to be moved into their respective B positions. When valves V1-V4 are in their flushing positions, limit switches LS7-LS10 will be closed, thus energizing relay R7. Contacts R7a will open, therefore, positively preventing inadvertent actuation of solenoid J by closing switch 345. Contacts R7b will close, locking in relay R7 and maintaining power to solenoid L.

When relay R7 is energized, relay contacts R7c will be closed, thus energizing timer coil T4. Contacts T4a will immediately supply power to solenoid M which will actuate valve 241 (FIG. 8) and move valves V5a and V5b (FIG. 8) into their B positions. Solvent will now be supplied from tank 237 through valves V1-V4 to the mixers and nozzles. When timer T4 times out, contacts T4a will open, deenergizing solenoid M, and terminating the flush operation. Simultaneously, contacts T4b will close and energize solenoid N through contacts T5a. Solenoid N will actuate valve 253 (FIG. 8) to supply pressurized air to lines 243 and 245. Pressurized air will be forced through the systemic system until timer T5 times out and contacts T5a open to deenergize solenoid N. When this occurs, contacts T5b will close, energizing timer T6 and, at the same time, solenoid M via contacts T6a. Timers T5, T6, and T7 may be of the type having the time period determined by an R-C time constant in which a capacitor is charged through an associated resistor.

The flush operation will thus be repeated for the duration of the timing cycle of timer T6. When timer T6 times out, solenoid M will be deenergized and contacts T6b will close, with the result that timer T7 will be energized. Power will be supplied to solenoid N through contacts T7a, thus resulting in air being supplied to the systemic system for the duration of the timing cycle of timer T7. When timer T7 times out, solenoid N will be deenergized and relay coil R8 will be energized through contacts T7b. R8 will, in turn, open normally closed contacts R8a, thus deenergizing coil R7 and preventing any further flush operation. Contacts R7b will then open, removing power from solenoid L and thus returning valves V1-V4 to their A positions. Contacts R7c will also open, thus precluding operation of solenoids M or N. The flush operation is completed by actuation of switch 351 which, through contacts R2c and R7d, energizes solenoid O. This causes valve 301 (FIG. 9) to apply hydraulic fluid to cylinder 47 such that the nozzle carriage is returned to its coating position above the conveyor.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. Apparatus for coating a glass container with a layer of plastic comprising:
    means for rotating a glass container about a horizontal axis and moving said container past a coating station,
    a plurality of liquid applicator nozzle means, positioned above the coating station, each of said nozzle means, including a plurality of fluid carrying tubes distributed axially along said container, for supplying uncured plastic liquid to an associated area on the container as the container rotates,
    means for supplying predetermined quantities of uncured plastic liquid to respective ones of said plurality of nozzle means, and
    means for rotating said container about a horizontal axis after uncured liquid plastic is applied to said container at said coating station such that said container is rotated as said plastic cures,
    whereby each of said nozzle means provides a coating of desired thickness on its associated container area.

2. The apparatus of claim 1 further comprising means for moving said plurality of nozzle means parallel to the direction of movement of the container past the coating station such that said plurality of nozzle means are positioned above the bottle for at least an entire rotation of the container.

3. The apparatus of claim 2 in which said means for moving said plurality of nozzle means includes means to move said plurality of nozzle means parallel to the direction of container movement for a predetermined period of time after said nozzle means terminates coating, such that said nozzle means may be drained completely.

4. The apparatus of claim 1 in which said plastic liquid material is produced by mixing two constituent materials and in which said means for supplying such fluid comprises:
    a mixing device for mixing the two constituent materials,
    a plurality of pairs of metered pump means for pumping the constituent materials to said mixing device,
    a source of hydraulic fluid, and
    a plurality of hydraulic motor means connected to said source of hydraulic fluid, each of said motor means operatively connected to an associated pair of pump means such that the proper proportions of constituent plastic materials will be pumped to said mixing device.

5. The apparatus of claim 1 further comprising means for pumping a solvent through said plurality of nozzle means such that said nozzle means may be cleaned.

6. The apparatus of claim 1 further comprising means for irradiating each container with infrared radiation subsequent to the application of plastic fluid to the container as said container continues to rotate such that the container coating is cured.

* * * * *